United States Patent [19]
Perlman

[11] Patent Number: 5,962,064
[45] Date of Patent: Oct. 5, 1999

[54] METHOD AND COMPOSITION FOR PREVENTING OIL SEPARATION IN VEGETABLE KERNEL BUTTERS BY COMBINING WITH MICROPARTICULATE SILICON DIOXIDE

[75] Inventor: Daniel Perlman, Arlington, Mass.

[73] Assignee: Brandeis University, Waltham, Mass.

[21] Appl. No.: 08/941,569

[22] Filed: Sep. 30, 1997

Related U.S. Application Data

[60] Provisional application No. 60/030,873, Nov. 13, 1996, and provisional application No. 60/035,906, Jan. 27, 1997.

[51] Int. Cl.$^6$ ....................................................... A23L 1/38
[52] U.S. Cl. .......................... 426/633; 426/519; 426/601; 426/613; 426/654
[58] Field of Search ..................................... 426/633, 654, 426/601, 613, 519

[56] References Cited

U.S. PATENT DOCUMENTS 4,980,192  12/1990  Finkel ...................................... 426/631

FOREIGN PATENT DOCUMENTS 0979730  6/1972  Canada .

OTHER PUBLICATIONS

Cabot Technical Data Information, "CAB–O–SIL® Fumed Silica as a Conditioning Agent for the Food Processing Industry," Cabot Corporation, Tuscola, IL, Oct. (1989).

Eastman Chemical Company brochure entitled "Stabilizers for Peanut Butter" (Publication ZM–91A, Nov. 1993).
Silicon Dioxide—Section 172.480 and "Peanut Butter—Section 164.150," *Title 21—Food and Drugs*, FDA Guidelines.
*Laws of Malaysia, 1985 Malaysia Food Regulations*, Article R.259.
"Syloid® Silica Typical Physical & Chemical Properties" Information Sheet, GraceDavison, Inc., Baltimore, MD.
"Silica Gel Application guide," GraceDavison, Inc., Baltimore, MD.

*Primary Examiner*—Helen Pratt
*Attorney, Agent, or Firm*—Lyon & Lyon LLP

[57] ABSTRACT

Stabilized peanut butter and other vegetable kernel butters, and vegetable kernel butter-containing food compositions such as peanut butter-containing food composition are described. The stabilized peanut butter or other vegetable kernel butter include a mixture of ground seed or nuts, and between approximately 0.25% and 4% by weight of microparticulate silicon dioxide (silicon dioxide measured as the anhydrous weight content of $SiO_2$), and/or between approximately 0.25% and 5% by weight of propylene glycol. Also described is a method for preventing the spontaneous (natural) separation of oil and ground kernel solids in vegetable kernel butter or a vegetable kernel butter-containing food composition by combining between approximately 0.25% and 4% by weight of microparticulate silicon dioxide and/or between approximately 0.25% and 5% by weight of propylene glycol with the vegetable kernel butter.

21 Claims, No Drawings

METHOD AND COMPOSITION FOR PREVENTING OIL SEPARATION IN VEGETABLE KERNEL BUTTERS BY COMBINING WITH MICROPARTICULATE SILICON DIOXIDE

RELATED APPLICATIONS

This application claims the benefit of United States Provisional Application Perlman, USE OF MICROPARTICULATE SILICON DIOXIDE AS A STABILIZER FOR PEANUT BUTTER TO PREVENT PEANUT OIL SEPARATION, application Ser. No. 60/030,873, filed Nov. 13, 1996, and Perlman, USE OF MICROPARTICULATE SILICON DIOXIDE AS A STABILIZER FOR VEGETABLE KERNEL BUTTER TO PREVENT OIL SEPARATION, application Ser. No. 60/035,906, filed Jan. 27, 1997, which are hereby incorporated by reference in their entireties.

BACKGROUND OF THE INVENTION

This invention relates to the field of food products and oil stabilizing components thereof.

The description below is provided solely to assist the understanding of the reader, and is not an admission that any of the information constitutes prior art to the present invention.

Peanut butter is a food paste prepared by grinding shelled, roasted, skinned and degermed peanuts. It is used directly as a paste, or as an ingredient in many food products, including sandwich and cracker spreads, candies and desserts, cooking sauces, and baked products.

In the United States, to be packaged and labeled as peanut butter, the paste must contain a minimum of 90% by weight peanuts. The remaining 10% may include optional ingredients such as sugar, salt, preservatives, stabilizers, non-peanut fats, modified fats, and fat substitutes. Approximately 50% by weight of the peanut butter is fat.

The term "natural" peanut butter generally refers to a peanut butter whose fat (triglyceride) content is limited to natural (unmodified) peanut oil. A two tablespoon (32 g) serving of such peanut butter having a fat content of 50% by weight, contains approximately 16 g of peanut oil. When a peanut butter is reduced in its fat content by at least 25% (to approximately 12 g per serving), the product qualifies as a "reduced fat" product in the U.S.

In other countries, peanut butter is defined by different standards. For example, in Malaysia peanut butter must contain at least 85% by weight peanuts, of which at least 20% must be protein. Edible fat and oil content may be not more than 55% and water content not more than 3%, with optional salt and hydrogenated vegetable oil being not more than 2% and 5% respectively (Laws of Malaysia, 1985 Malaysia Food Regulations, Article R.259).

Notwithstanding these definitions, for the purposes of the present invention, peanut butter is defined as any food product (including butters, spreads, pastes, sauces, toppings and the like), the majority of which (at least 50% by weight) is ground peanuts.

In the process of grinding peanuts to make fine, coarse, and chunky styles of peanut butter, a substantial amount of free peanut oil is released, producing a viscous suspension of solid peanut particles in oil. During storage of the peanut butter at room temperature, the peanut oil separates from the peanut solids, and when packaged in a container, the peanut solids settle to the bottom, and an oil layer forms at the surface. Following purchase of currently available natural peanut butters, the separated peanut oil supernatant phase is generally hand-mixed with the underlying solids within the container. This mixing tends to be awkward and is apt to result in oil spillage, but is important in providing an easily spreadable peanut butter product which, in the U.S., is often spread on slices of soft bread to make the traditional peanut butter and jelly sandwich.

Refrigeration of natural peanut butter significantly retards oil separation, but also significantly thickens the product, impairing ones ability to spread the peanut butter, particularly on soft bread. Without refrigeration, and depending upon the ambient temperature, oil separation can become an annoyance within a short time, e.g., a week or two. Removal of the major proportion of free peanut oil is not a satisfactory solution to the problem of oil separation because the remaining solids form a relatively dry paste which is difficult to spread. Accordingly, manufacturers of commercial peanut butter remove only approximately 25% of the peanut oil to produce a "reduced fat" product, and a fat substitute such as maltodextrin (which is also considered a bulking agent) is often added to replace the fat removed, to improve the fluidity and spreadability of the product.

The current commercial method used for eliminating oil separation in peanut butter is to supplement the peanut butter with a suitable stabilizer such as a fat which is solid at room temperature (e.g., partially and/or fully hydrogenated vegetable oil) which binds together the peanut solids and oil by forming a semi-solid matrix or paste. An Eastman Chemical Company brochure entitled "Stabilizers for Peanut Butter" (Publication ZM-91A, November 1993) states, > Stabilizers help provide good spreadability over a wide range of temperatures and stiffnesses without cracking or pull-away. Stabilizers containing emulsifiers, such as distilled monoglycerides, also impart creaminess and improved mouth release to peanut butter. Stabilizers should be added to the grinder when temperatures exceed their melting point. As the peanut butter cools, the stabilizer begins to crystallize, forming the matrix. For good stability, it is important that the peanut butter be packaged at the proper temperature. The peanut butter should be tempered for a minimum of 24 hours before shipping. This allows time for additional crystal growth and formation of a good crystalline network. Stabilizers are normally prepared from fully hydrogenated vegetable oils and/or distilled monoglycerides derived from fully hydrogenated vegetable oils. Mono- and diglycerides derived from fully hydrogenated vegetable oils are also used . . . The type and amount of stabilizer will depend on the desired consistency and mouth feel of the peanut butter along with the amount of oil present, particle size after grinding, and plant operating conditions.

The Eastman brochure suggests usage levels for these stabilizers in the range of 1.3% to 2.0% to solidify peanut butter.

Other manufacturers offer stabilizers with fully hydrogenated vegetable oils in combination with partially hydrogenated monoglycerides. The latter are reported to provide an agreeable creamy mouth feel. All of the peanut butter stabilizers containing fully hydrogenated and partially hydrogenated vegetable oils, are enriched in saturated fats and, being solid or semi-solid at room temperature, form a weak crystalline matrix when highly diluted (approximately 50-fold) into peanut butter. This semi-solid matrix prevents peanut oil separation.

Several significant limitations exist in the use of the currently marketed peanut butter stabilizers. For example, the stabilizers must be used with carefully controlled temperatures to control the fat crystallization and peanut butter "setting" process in order to achieve the proper peanut butter consistency and texture. Moreover, the elevated melting temperatures of the peanut butter stabilizers described above (which principally contain hydrogenated oils and/or monoglycerides with melting points between 63° C. and 68° C.) contrast with the much lower mouth temperature of 37° C. These elevated melting temperatures contribute to the unpleasant sticky and fatty mouth feel of commercial peanut butter.

Furthermore, the stabilizers which contain partially hydrogenated fatty acids, contribute trans fatty acids such as elaidic acid to the diet. These trans fatty acids have been implicated in elevating serum cholesterol levels in humans and contributing to coronary heart disease. Accordingly, it would be desirable to find another edible agent with a more agreeable mouth feel which could replace some or all of the conventional stabilizers currently used in commercial peanut butters to prevent oil separation. Preferably, the stabilizer(s) would not be based on saturated or hydrogenated fats so that the health quality of peanut and other vegetable kernel butters could be improved. It would also be desirable if such an agent were already generally recognized as safe under the FDA or FDA-approved as a food ingredient or food additive.

SUMMARY OF INVENTION

This invention features the novel use of hydroxylated fat-insoluble agents including hydroxylated microparticulate silicon dioxide, or propylene glycol or mixtures thereof to stabilize peanut butter or other seed or nut butters (vegetable kernel butter) against oil separation. Similarly, these agents are used to stabilize the peanut butter or vegetable kernel butter constituent in derivative foods and mixed food products (hereinafter collectively termed peanut butter-containing food compositions or vegetable kernel butter-containing food compositions). Used either alone or in combination with conventional hard fat-based stabilizers of peanut butter and other vegetable kernel butter stabilizers, silicon dioxide and/or propylene glycol can be added to peanut butter or other vegetable kernel butter, not only to prevent such oil separation, but also to modify texture. Both saturated and unsaturated monoglycerides, as emulsifiers, have been used previously in peanut butter to impart a creamy texture and improve mouth release. As explained above, when stored at room temperature without a suitable stabilizer, natural peanut butter (a suspension of ground peanut solids in peanut oil), separates into its component parts, as do other vegetable kernel butters.

In this context, vegetable kernel butter refers to a food paste prepared from vegetable kernels, generally by grinding in the manner described above for peanut butter. "Vegetable kernels" refers to the edible inner portion of a seed, or the contents of the endocarp in drupes, similar fruits, or nuts (collectively termed "nuts").

The first hydroxylated fat-insoluble peanut butter stabilizer described in the present invention is hydroxylated microparticulate silicon dioxide (also termed silica). As employed in the present invention, it is readily available in a variety of finely divided particulate, i.e., microparticulate, forms. Such forms include amorphous fumed silica, silicon dioxide, amorphous silica gel, silica hydrogel, precipitated silica, colloidal silica, silica aerogel and crystalline silica. The term hydroxylated silicon dioxide refers to the presence of Si—OH chemical groups on the silica microparticles making the particles hydrophilic and capable of hydrogen bonding. It should be understood that such Si—OH groups are present on all material herein referred to as microparticulate silicon dioxide or microparticulate silicas.

To place these silica materials into a natural context, silicon has been shown to be an essential element for human connective tissue development, including bone and cartilage development, and is provided naturally in the diet within vegetable materials, primarily in the form of silicon dioxide, silica gel and soluble silicic acid.

Silicon dioxide, now recognized as an essential mineral nutrient for plant and animal development, is generally recognized as safe (GRAS), and has been a GRAS food constituent under the FDA for approximately 40 years. It is explicitly approved as a direct food additive at levels up to 2% by weight (measured as the anhydrous $SiO_2$ content) under the published FDA guidelines, Food Additives, Section 172.480, Principal Section-Free-Flow and Anti-Caking in Foods. For example, it is approved for its free-flow and anti-caking properties in powdered and grated foods, for acting as a carrier for flavoring oils, and as a defoaming agent in liquids.

The second non-fat stabilizer described in the present invention is propylene glycol. Propylene glycol, which is also known as 1,2-propanediol, has a chemical formula of $C_3H_8O_2$. It is used extensively as a direct food additive, serving as a humectant in food products. Humectants are generally hygroscopic materials which prevent loss of moisture in foods such as shredded coconut, marshmallows, and candies, for example. Although generally manufactured by synthetic means rather than by a biological process, propylene glycol is metabolized in humans to the natural metabolites, pyruvic acid and acetic acid. Thus, in fact, propylene glycol functions as a biological source of energy through the Krebs metabolic cycle. Like silicon dioxide, propylene glycol is hydrophilic, contains multiple hydroxyl groups, and can therefore participate in hydrogen bonding, Both substances are GRAS food constituents under the FDA, and are approved for use in a wide variety of foods. Propylene glycol is approved for use at levels ranging from approximately 2% in miscellaneous foods to 97% in flavorings and seasonings. As a humectant in nuts and nut products, under the FDA it is approved at levels up to 5% by weight.

In the present invention, it was discovered that the microparticulate silicas (such as the amorphous fumed silicas having a particle diameter of less than about 0.05 microns) can serve as a stabilizer to remedy the problem of oil separation in natural peanut butter or other vegetable kernel butter. Depending upon the oil content of the peanuts or other vegetable kernels, and the manufacturing method for the peanut butter or other vegetable kernel butter, when added at a final concentration of between approximately 0.25% and 4.0% (preferably between 0.25% and 2.0%) by weight (based upon anhydrous $SiO_2$ content), these silicas can prevent peanut oil separation (or other vegetable kernel oil separation) for an indefinite period of time. In other preferred embodiments, the microparticulate silicon dioxide is added to a final concentration of between 1% and 2%.

With regard to propylene glycol, when added to peanut butter and other nut butters at a concentration ranging between approximately 0.25% and 5% by weight (preferably between 0.4% and 1.5% by weight), propylene glycol can reduce or prevent peanut oil separation and the separation of other vegetable kernel oils from the kernel solids in the butters indefinitely. In other preferred embodiments, the propylene glycol is added to a final concentration of between 0.6% and 2%, or between 0.7% and 1.2%. These selections of stabilizer (both microparticulate silicon dioxide and propylene glycol) content are also applicable to preferred embodiments of the additional aspects described below.

Unlike conventional peanut butter stabilizers (containing hard fats) which tend to contribute a persistent sticky and/or fatty mouth feel to the peanut butter, the microparticulate silicas and/or propylene glycol tend to preserve the original mouth feel of natural peanut butter, i.e., a perception of spontaneous melting, mouth release, and dispersal in the mouth fluids.

Thus, in a first aspect, the invention features a stabilized peanut butter or peanut butter-containing food composition which includes a mixture of ground peanuts, and between approximately 0.25% and 4% by weight of microparticulate silicon dioxide and/or between 0.25% and 5% by weight of propylene glycol.

The percent by weight represents the anhydrous weight content of $SiO_2$ or the content of propylene glycol multiplied by 100 divided by the weight of the ground peanuts. In other aspects as described below, the percent by weight of the respective stabilizers can be calculated in terms of the peanut butter or peanut butter-containing food composition.

In the context of this invention, the term "ground peanuts" refers to the combination of solids and oils produced by physically breaking down peanuts to form smaller particles, but does not depend on the specific method utilized. Thus, the method of forming ground peanuts may involve grinding, chopping, or other techniques or combinations of techniques. However, the term does not include components of peanut butter or other peanut butter-containing food composition which is not a direct product of the process of physically breaking down the peanuts.

In preferred embodiments of this aspect, the stabilized peanut butter or peanut butter-containing food composition includes between approximately 0.25% and 2% by weight of microparticulate silicon dioxide and/or between 0.40% and 1.5% by weight propylene glycol. Also in preferred embodiments, the form of silicon dioxide in the microparticulate silicon dioxide is selected from the group consisting of amorphous fumed silica, amorphous silica gel, silica hydrogel, precipitated silica, colloidal silica, silica aerogel and crystalline silica. More preferably, the form of silicon dioxide in the microparticulate silicon dioxide is amorphous fumed silica. When using amorphous fumed silica, the primary particle diameter of the microparticulate silicon dioxide is preferably between approximately 0.005 and 0.025 microns.

The peanut butter or peanut butter-containing food composition can further include at least one other constituent selected from the group consisting of fully hydrogenated vegetable oil, saturated or unsaturated monoglycerides, diglycerides, partially hydrogenated vegetable oil, and maltodextrin, in which the cumulative proportion by weight of silicon dioxide plus the other constituent(s) does not exceed 10% of the weight of the peanut butter (consistent with the limiting definition of the term "peanut butter" in the U.S.).

In another aspect, this invention features a method for preventing or slowing the spontaneous separation of peanut oil and ground peanut solids in peanut butter or a peanut butter-containing food composition. This method includes combining between approximately 0.25% and 4% by weight of microparticulate silicon dioxide and/or between 0.25% and 5% propylene glycol with the peanut butter.

In one preferred embodiment of this aspect, the method includes combining a microparticulate silicon dioxide with the peanut butter, in which the percentage by weight of $SiO_2$ does not exceed 2%. In another preferred embodiment the method includes combining propylene glycol with the peanut butter in which the percentage by weight propylene glycol does not exceed 1.5%. In another preferred embodiment of these aspects, the method includes combining microparticulate silicon dioxide and/or propylene glycol with the peanut butter, and further adding at least one other constituent selected from the group consisting of fully hydrogenated vegetable oil, monoglycerides, diglycerides, partially hydrogenated vegetable oil, and maltodextrin, in which the proportion by weight of silicon dioxide plus the other constituent(s) does not exceed 10% of the weight of the peanut butter.

In yet another aspect, this invention features a method for modifying the texture of peanut butter. This method includes combining between approximately 0.25% and 4% by weight of microparticulate silicon dioxide and/or between approximately 0.25% and 5% propylene glycol with the peanut butter, in which the percent by weight represents the anhydrous weight content of $SiO_2$ and/or propylene glycol multiplied by 100 divided by the weight of the ground peanuts.

In one preferred embodiment of this aspect, the method includes combining microparticulate silicon dioxide with the peanut butter, in which the percentage by weight of $SiO_2$ does not exceed 2%. In another preferred embodiment, the method includes combining propylene glycol with the peanut butter, in which the percentage by weight propylene glycol does not exceed 1.5%. In another preferred embodiment of this aspect, the method includes combining microparticulate silicon dioxide and/or propylene glycol with the peanut butter, and further adding at least one other constituent selected from the group consisting of fully hydrogenated vegetable oil, monoglycerides, diglycerides, partially hydrogenated vegetable oil, and maltodextrin, in which the proportion by weight of silicon dioxide plus the other constituent(s) does not exceed 10% of the weight of the peanut butter.

In related aspects, more generally the invention provides food compositions and methods as above in which the oil in vegetable kernel butter is stabilized against separation.

Thus, the invention provides a stabilized vegetable kernel butter-containing food composition which contains a mixture of ground, oil-bearing edible kernels from seeds or nuts and between approximately 0.25% and 4.0% by weight of microparticulate silicon dioxide and/or between approximately 0.25% and 5% propylene glycol. Preferably between 0.25% and 2.0% silicon dioxide and/or between approximately 0.25% and 1% propylene glycol, and more preferably between 0.4% and 0.8% propylene glycol. In preferred embodiments the kernels are selected from peanuts, cashews, almonds, hazelnuts, walnuts, Brazil nuts, coconuts, sesame seed, soybeans, and sunflower kernels.

Similarly, the invention provides a method for preventing or slowing the spontaneous separation of vegetable kernel oil and ground vegetable kernel solids in a vegetable kernel butter containing food composition by combining between approximately 0.25% and 4.0% of microparticulate silicon dioxide and/or between 0.25% and 5% propylene glycol with the vegetable kernel butter.

Other features and embodiments of the invention will be apparent from the following description of the preferred embodiments, and from the claims.

DETAILED DESCRIPTION OF THE PREFERRED EMBODIMENTS

As indicated in the Summary above, the present invention involves combining microparticulate silicon dioxide and/or propylene glycol with peanut butter and/or peanut butter-containing food compositions (or other vegetable kernel butter or vegetable kernel butter-containing food compositions) to prevent separation of oil and solids in the peanut butter or other vegetable kernel butter. Additionally, the silicon dioxide can provide desirable alterations in the texture of the peanut butter.

Several different commercial products and manufacturers of food grade propylene glycol and $SiO_2$ are available, which meet all of the FDA requirements for a direct food additive. Propylene glycol suitable for food use is available from Arco Chemical Company (Newtown Square, Pa.). Among the $SiO_2$ products are two known as fumed silica and silica gel.

Fumed silica is an ultra-fine, microparticulate amorphous form of silica (primary particle diameter, less than 0.03 microns) and is available, for example, as Cab-O-Sil® (manufactured by the Cabot Corporation). The Cabot Corporation (Tuscola, Ill.), in a technical data brochure entitled "Cab-O-Sil® Fumed Silica as a Conditioning Agent for the Food Processing Industry" (dated October 1989), lists recognized uses of fumed silica in the food processing industry. These include improving the flow of powders, adsorbing moisture, reducing caking of powders, preventing waxy food congealing, improving dispersion of dry powders in liquids, acting as a dry carrier (e.g., with flavor oils) to convert liquids into flowing powders, acting as a food grinding agent, and acting as a clarifying agent for wines and fruit juices.

Fumed silica particles tend to form extended hydrogen-bonded chains and loose aggregates (via the silanol Si-OH groups), particularly in non-polar non-hydrogen bonding liquids. Because the particles are essentially non-porous, surface bonding interactions with other substances (solid particles, liquids, and even gasses) tend to predominate.

Silica gel materials, on the other hand, being microporous, are physically distinct from fumed silica. This porosity property allows internal absorption of liquids and internal adsorption of gasses. With microparticulate silica gel, bonding of substances can occur internally, externally and between particles.

Finely divided amorphous silica gel is available, for example, as Syloid® (diameter, 3–4 microns) and Sylox® (diameter, 2 microns), as manufactured by GraceDavison, Inc. (Baltimore, Md.).

Technical literature accompanying both silica gel and fumed silica commercial products recognizes that microparticulate silicon dioxide material, when used as a free-flow agent for powdered foodstuffs, may have the "side benefit" (when the powdered food is placed in water or milk for example) of thickening the resulting liquid. Typically, however, food gums rather than silica are used for this purpose.

With regard to edible oils, silicon dioxide has been used to remove impurities, such as trace metals, which can cause oil breakdown by promoting the oxidation of such oils. Additionally, silicon dioxide is used as a carrier for essential fragrance and flavor oils. For example, for such use, Grace Davison, Inc. advertises that Syloid® silica gel can absorb up to 2.8 times its weight in essential oils (current but undated Grace Davison brochure entitled "Syloid® Silica Typical Physical and Chemical Properties".

With regard to Cab-O-Sil® grades M-5 and EH-5, having particle diameters of less than 0.03 microns, addition of either of these amorphous fumed silicas to natural peanut butter, reduced fat peanut butter, or other vegetable kernel butter has been shown to remedy the problem of oil separation. These silicas when added to the peanut butter or other vegetable kernel butter at a final concentration of between approximately 0.7% and 1.5% by weight can prevent peanut oil separation for an indefinite period of time. Thus, a uniform suspension of peanut solids in peanut oil is maintained. Similar results were obtained for the oil stabilization of other vegetable kernel butters.

To a lesser degree, the amorphous silica gels having a larger particle diameter (typically 1–5 microns), such as Syloid® grade 244 and Sylox® grade 2, are also useful, but are less effective on a weight for weight basis than the amorphous fumed silicas. Furthermore, the silicas produce a textural firming of the peanut butter which is helpful in removing peanut butter by knife or spatula from a container.

It is noted that the concentrations of silicas cited above which are useful for reducing or entirely preventing peanut oil separation in peanut butter are typically less than 2% by weight, with similar results for other vegetable kernel butters. This is compatible with the 2% weight proportion specified as the current FDA-specified limit for use of silica as a direct food additive (based upon the weight of anhydrous silica). The amount of silica which was tested ranged from approximately 0.25% to 4.0% by weight of the peanut butter, depending upon the type and source of silica, and the peanut butter particle size. For example, a large proportion of peanut oil is freed in producing a finely ground "smooth" grade of natural peanut butter. Such peanut butters can be "corrected" for their oil separation with the addition of between 0.75% and 1.5% by weight of amorphous fumed silica (M-5 and EH-5 from the Cabot Corporation).

Under the historically described uses of microparticulate silica in food, its use as an anti-caking and free-flow agent is clearly distinguished from the use of silica in the present invention. The anti-caking/free-flow usage is terminology applying to packaging, dispensing, and eventually dispersing powdered foods (e.g., cake mixes, powdered drink mixes, etc.) in a liquid such as water or milk. Peanut butter, which is a suspension of peanut solids in oil, and other vegetable kernel butters, do not fall into this category. Likewise the historical use of propylene glycol as a humectant to prevent loss of moisture in foods is very different from its use in the present invention.

Given the history of peanut oil separation in peanut butter, it is surprising that two existing food additives used for different purposes can solve the oil separation problem. Food chemists have been seeking new and improved peanut butter stabilizers for many years and, as yet, have not discovered propylene glycol or the silica materials. In fact, the chemical interaction(s) between either propylene glycol or silica particles and peanut butter component(s) which results in peanut butter stabilization, remains only partially understood.

In the initial study of this interaction, an experimental model system was developed using low speed centrifugation to simulate, and simultaneously accelerate, the natural process of settling of peanut solids which accompanies oil separation in peanut butter. This model system, used in the Examples below, has allowed rapid testing and screening of a variety of new potential stabilizers for peanut butter to replace, or to be used in combination with those stabilizers already in use. This system was also used for testing the stabilization of other vegetable kernel butters.

The following are non-limiting examples of the compositions and methods of the instant invention.

EXAMPLE 1

Experimental Test System

In this test system, homogeneous peanut butter, or other vegetable kernel butter (typically 10–25 g samples), containing any one of a variety of stabilizers which had been thoroughly blended into the peanut butter, were placed in 50 ml centrifuge tubes (Corex™ brand glass, Corning Corp., Corning, N.Y.) and subjected to low speed centrifugation (1500–2000 rpm using a Sorvall SS34 rotor having a 10 cm maximum radius, manufactured by the DuPont Company, Wilmington, Del.).

Low speed centrifugation* (see footnote to this Example) was conducted for between 2 and 5 minutes at room temperature (22° C.) and produced centrifugal forces of between approximately 200–500 times gravity (abbreviated 200–500×g). A "control" sample (homogeneously mixed natural peanut butter without any added stabilizer) was always included in the centrifuge rotor (which holds up to 8 samples) to assure that centrifugation had proceeded for a sufficient period of time to allow completion of "simulated natural settling". Simulated natural settling was evidenced and defined by approximately 5%–12% of the volume of the peanut butter sample separating into a clear peanut oil supernatant on the surface of the peanut solids.

The proportion of peanut oil separating from the peanut solids depends upon the fineness of the peanut grind, the total oil content of the peanuts and other factors (e.g., temperature and grinding pressure) which vary depending upon manufacturing conditions In this first Example, 1.5% by weight of the candidate stabilizer was blended into 15 g samples of "Natural Creamy" style peanut butter (J.M. Smucker Company, Orville Ohio) and centrifuged at low speed (500×g) as described above. Two microparticulate silica gels (Sylox™ and Syloid®) and one fumed silica (Cab-O-Sil®) were tested. Following centrifugation, the volume of separated supernatant oil was measured and these volumes converted to a percentage of the "control" sample (lacking any stabilizer). Examples of test results are shown in Table I.

TABLE I

| Candidate Stabilizer | Volume of Separated Oil (ml) | Relative Volume Percentage |
|---|---|---|
| none (control) | 0.75 | 100% |
| Sylox® #2 silica gel | 0.205 | 27% |
| Syloid® #244 silica gel | 0.105 | 14% |
| Cab-O-Sil® M-5 fumed silica | 0.015 | 2% |

Observations and conclusions from this experiment were as follows: Each of the silica agents (present at a concentration of 1.5% by weight) reduced the amount of oil separation in natural peanut butter. Of the two silica gel materials tested, the Syloid® #244 was more effective than the Sylox® #2 on a weight for weight basis. However, the Cab-O-Sil® M-5 fumed silica was the most effective, almost eliminating oil separation.

It was discovered that centrifugation at a significantly higher speed, even for a brief period of time(e.g., 4,000–5000 rpm for one minute, generating centrifugal forces greater than approximately 2,000×g) was not as useful for screening and testing potential peanut butter stabilizers. Even with stabilizers present, these high forces allowed the peanut oil to separate from the solids in many instances. Stated in another way, the forces involved in maintaining a dispersion of peanut solids in peanut oil by means of a stabilizer, can certainly be weaker than 2000×g. This is not surprising, given that a number of food emulsions, such as mayonnaise, which normally have long term stability can be easily collapsed into separate phases by high speed centrifugation. Accordingly, low speed centrifugation as described above was used in the screening and testing peanut butter stabilizers. Peanut butter samples with stabilizers were also challenged by accelerated aging at a temperature of approximately 100° F.

Stabilization of the oil separation of reduced fat peanut butter was also tested and found to be effective. The tests used reduced fat peanut butter from J.M. Smucker Co. It was found that the addition of $SiO_2$ as described above, was effective in reducing oil separation in the reduced fat peanut butter at $SiO_2$ concentrations approximately ¼ to ½ of that needed for normal peanut butter.

EXAMPLE 2

The above samples from Example 1, along with their varying amounts of separated oil, were sealed in their original centrifuge tubes and stored at room temperature (68° F.) for a period of six weeks to test the ability of each agent to stabilize the peanut butter samples over time. The measurements described above were then repeated without any additional centrifugation step. The results are shown in Table II.

TABLE II

| Candidate Stabilizer | Volume of Separated Oil (ml) | Relative Volume Percentage |
|---|---|---|
| none (control) | 0.81 | 100% |
| Sylox® #2 silica gel | 0.33 | 41% |
| Syloid® #244 silica gel | 0.11 | 14% |
| Cab-O-Sil® M-5 fumed silica | 0.0 | 0% |

Observations and conclusions from this experiment were as follows: Comparing these numbers with those in Example 1, a small increase in oil separation in the control sample occurred (0.81 ml versus the original 0.75 ml). This result suggests that the low speed centrifugation step in Example 1 came close to liberating the full amount of oil which would have been released by natural settling in 6 weeks. With the silica gels, the amount of oil released in the Sylox® #2-containing sample significantly increased, while that in the Syloid® #244 sample remained approximately constant. This result indicates better stabilization over time (and using a smaller amount of material) is achieved with the Syloid® #244 material. However the best stabilization was achieved using fumed silica (1.5% Cab-O-Sil® M-5). In fact, the small amount of oil initially released (0.015 ml) during low speed centrifugation was gradually reabsorbed by the peanut butter during storage. Therefore, a concentration of 1.5% by weight Cab-O-Sil® M-5 fumed silica appears adequate for permanently stabilizing this peanut butter ("Smucker's Natural Creamy" style).

EXAMPLE 3

To determine the minimum but sufficient concentration of a silica-based peanut butter stabilizer to be used in a particular peanut butter, the following test was performed. Ten gram quantities of "smooth" style natural peanut butter (Teddie® brand "Old Fashioned Peanut Butter" manufactured by the Leavitt Corporation, Everett, Mass.) were placed in a series of identical centrifuge tubes (as in Example 1). Increasing concentrations of Cab-O-Sil® M-5 fumed silica ranging from zero to 1.5% by weight, were added and blended into these 10 g quantities of peanut butter. These blended samples were then centrifuged at low speed for 5 minutes to simulate natural settling of peanut solids and release unbound ("non-stabilized") oil. Finally, the samples were sealed in their centrifuge tubes and incubated for two weeks at 100° F. to accelerate any additional oil separation which might occur upon long term storage at room temperature. The volume of separating oil found on the surface of each peanut butter sample was measured by withdrawing the oil into a calibrated pipette. These volumes were converted to volume percentages of the control (100%) sample having no stabilizer. Subtracting these percentages from 100% yields the percentage of oil stabilized. The results are shown in Table III.

TABLE III

| Stabilizer Concentration | Separated Oil (ml) | Oil Separating | Oil Stabilized |
| --- | --- | --- | --- |
| none (control) | 0.63 | 100% | 0% |
| 0.50% | 0.41 | 65% | 35% |
| 0.75% | 0.32 | 51% | 49% |
| 1.0% | 0.22 | 35% | 65% |
| 1.25% | 0.10 | 16% | 84% |
| 1.50% | 0.00 | 0% | 100% |

Observations and conclusions from this experiment were as follows: The percentage of oil stabilized by the fumed silica is directly proportional to the concentration of fumed silica added. With this particular peanut butter (Teddie® brand), a level of approximately 1.5% by weight Cab-O-Sil® M-5 appears to be the minimum and sufficient concentration needed to achieve oil stabilization.

EXAMPLE 4

To determine whether one grade of fumed silica is superior to another for the purpose of stabilizing peanut butter, two different grades of Cab-O-Sil® were compared (grades M-5 and EH-5) using the experimental system described in Examples 1 and 2. Ten grams rather than 15 g of the "Natural Creamy" style peanut butter (J.M. Smucker Company) were utilized in each sample and centrifugation was for 5 min. at 500×g. Following centrifugation, the sample tubes were sealed and stored for five weeks at room temperature to assure long term stability against oil separation. The results are shown in Table IV. The weight percentages of each stabilizer in the peanut butter are listed. The relative percentages of oil are by volume.

TABLE IV

| Stabilizer (wt. %) | Separated Oil (ml) | Oil Separating | Oil Stabilized |
| --- | --- | --- | --- |
| none (control) | 0.60 | 100% | 0% |
| 0.7% M-5 fumed silica | 0.11 | 18.3% | 81.7% |
| 0.7% EH-5 fumed silica | 0.05 | 8.3% | 91.7% |
| 1.1% M-5 fumed silica | 0.02 | 3.3% | 96.7% |
| 1.1% EH-5 fumed silica | 0.01 | 1.7% | 98.3% |

Observations and conclusions from this experiment were as follows: On a weight basis, Cab-O-Sil® EH-5 is a somewhat more efficient stabilizer than Cab-O-Sil® M-5. Comparing the more accurately readable separated oil volumes obtained using 0.7% of the fumed silicas, it is probable grade EH-5 is 10–15% more efficient on a weight for weight basis than M-5 in preventing oil separation in peanut butter. This is consistent with the fact that EH-5 fumed silica has a smaller primary particle size and greater surface area per gram than does M-5.

EXAMPLE 5

The use of microparticulate silicon dioxide to improve the texture of conventional commercial peanut butters while also helping to maintain stability against oil separation was demonstrated. To this end, each of two commercial peanut butters containing conventional hydrogenated fat stabilizers were separately combined with natural peanut butter and a fumed silica stabilizer (Cab-O-Sil® M-5 described in the Examples above). In this particular example, equal proportions of natural peanut butter (5 g of Teddie® brand, described above) and hydrogenated fat-containing peanut butter (5 g) were thoroughly mixed to form 50:50 peanut butter blends. The hydrogenated commercial peanut butters were Skippy® creamy style (Best Foods Division, CPC International, Englewood Cliffs, N.J.) and Jiff® creamy style (Procter & Gamble, Cincinnati, Ohio)]. The Skippy® and Jiff® brand container labels list partially and fully hydrogenated vegetable oils and mono- and diglycerides. The concentrations of fumed silica used in the blends were 0.75% and 1.1% by weight (final concentrations). Following the blending process, the samples (each 10 g) were centrifuged for 4 min. at 500×g as described in Example 1 to simulate natural settling. One "control" sample (also 10 g) was used to monitor the total amount of oil separating in natural peanut butter, and a second control (also 10 g) monitored the total amount of oil separating in the 50:50 peanut butter blend. The Skippy® and Jiff® blends with natural peanut butter each yielded similar data with regard to oil separation. The data provided in Table V below are for the Skippy® product blended 50:50 with the "natural" Teddie® product. Separated oil volumes were measured initially after centrifugation, and again after 5 weeks storage at room temperature (without additional centrifugation) to test long term stability against oil separation. The initial and the 5 week oil volume readings were identical except in the case of the third sample below which showed a small amount of oil separation after 5 weeks.

TABLE V

| Fumed Silica Stabilizer (wt. %) | Separated Oil (ml) | Oil Separating | Oil Stabilized |
| --- | --- | --- | --- |
| none (100% natural) | 0.72 | 100% | 0% |
| none (50:50 blend) | 0.31 | 86% | 14% |
| 0.75% M-5 fumed silica | 0.05* | 14% | 86% |
| 1.00% M-5 fumed silica | 0.00 | 0% | 100% |

*initially 0.00

Observations and conclusions from this experiment were as follows: With regard to the 50:50 blend without fumed silica stabilizer (control), the maximum expected yield of separating peanut oil was 0.36 ml because this sample contained only 5 g of natural peanut butter, while the first sample listed above contained 10 g [hence the 86% extent of oil separation, i.e., (0.31/0.36)]. The small but measurable proportion of oil stabilized (14%) in the blend, suggests that the 50% Skippy® component (carrying the hydrogenated fat stabilizer) has only a slight excess capacity for immobilizing additional peanut oil. From these data it is apparent that fumed silica at the 0.75% level stabilized most of the peanut oil while the 1.00% level stabilized all of the oil.

With regard to the improvement of peanut butter texture, the above sample blends were taste-tested along side of the unmodified commercial products listed above by a panel of six people. There was uniform consensus that the 50:50 peanut butter blends, which contained fumed silica and only one-half of the normal commercial level of hydrogenated fat stabilizers, were more agreeable to the palate than the original hydrogenated fat stabilizer-containing commercial products described above. More specifically, it was reported that the blends had a noticeably reduced fatty mouth feel, i.e., better mouth release. The blends mixed more readily and rapidly in the mouth with saliva. Therefore, microparticulate silicas can be used either alone to stabilize peanut butter, or in combination with other stabilizers and texture modifiers (such as the monoglycerides used and listed in the Jiff® brand product) to cooperatively stabilize and control the texture of the final product.

EXAMPLE 6

To test whether microparticulate silicon dioxide could function over the long term to stabilize peanut butter against oil separation under normal and under challenging shelf storage conditions, various concentrations of fumed silica were mixed with peanut butter which was then packaged and stored at either room temperature or at 90° C. These tests, which were reported to Applicant, were conducted at the J.M. Smucker Company to simulate commercial production conditions, and typical versus "worst-case" retail storage conditions.

Cab-O-Sil® (grade M-5) was utilized throughout this test in mixture with "Natural Creamy" style peanut butter (J.M Smucker Company). The weight percentages of fumed silica in the peanut butter are listed.

After ninety-one days of storage, the volume of separating peanut oil was measured in each sample and compared to the volume of peanut solids. This volume ratio is expressed in the table below as a percentage of oil separation.

TABLE VI

| Stabilizer (wt. %) | Room Temp. Separating Oil (percent) | Elevated Temp. (90° C) Separating Oil (percent) |
|---|---|---|
| none (control) | 9.4 | 12.8 |
| 0.5% M-5 fumed silica | 6.9 | 11.5 |
| 1.0% M-5 fumed silica | 4.7 | 9.9 |
| 1.5% M-5 fumed silica | 4.5 | 7.4 |
| 2.0% M-5 fumed silica | 2.7 | 5.6 |

Observations and conclusions from this experiment were as follows: A two to three month storage test approximates the time interval between commercial production and retail sale of typical peanut butter. It is evident that reduction of oil separation during long term (e.g., three month) shelf storage is a function of the weight percentage of fumed silica added to the peanut butter. Oil separation in unmodified peanut butter as well as in peanut butter supplemented with fumed silica is accelerated by elevated storage temperature. During a three month interval at room temperature, the presence of 2.0% by weight Cab-O-Sil® M-5 fumed silica reduces oil separation approximately 3.5-fold. Separation of 2.7% by volume oil in a 1 pound jar of peanut butter represents a volume of less than 0.5 ounce. This compares with almost 2 ounces in the control (without fumed silica).

Importantly, any separating oil, once it has been mixed back into peanut butter containing, for example, 1.5–2.0% by weight fumed silica, will be slow to separate again. Therefore, such silica-containing peanut butter can be conveniently stored at room temperature (allowing easy spreading on bread) rather than under refrigeration (presently utilized for storage of natural peanut butters, making peanut butter spreading difficult).

EXAMPLE 7

Tests were carried out to determine whether microparticulate silicon dioxide could function to prevent or reduce the rate of oil separation in other oil-bearing seed and nut butters prepared by grinding seeds and nuts in the same manner as commercial peanut butter.

Accordingly, Applicant purchased a series of commercially available natural butters containing either only ground sesame seeds (sesame tahini butter), sunflower seed kernels, almonds or cashew nuts. Cab-O-Sil® (grade M-5) fumed silica was added at concentrations of 1.5% and 2.0% by weight, to 10 g samples of each of the various butters. Using the method described in Example 1, samples of each butter, both with and without the fumed silica, were centrifuged at low speed (1500 rpm) for 5 minutes at room temperature.

In each case, the presence of fumed silica reduced or eliminated oil separation in the seed or nut butter. In the most graphic example (sesame butter), the amount of oil separation measured in the control sample (lacking fumed silica) was 24% by weight following centrifugation, and 0.0% in the sesame butter sample containing 2.0% by weight fumed silica.

Observations and conclusions from this experiment were as follows: Microparticulate silica, and in particular, fumed silica at levels of approximately 2.0% by weight or less, are effective in stabilizing a wide variety of ground seed and nut butters, and by extension, a wide variety of food products containing or incorporating these ground seed and nut butters.

EXAMPLE 8

To determine the range of effective concentrations of propylene glycol to be used as a peanut butter stabilizer in a particular peanut butter, the following test was performed. Ten gram quantities of "smooth" style natural peanut butter (Teddie brand "Old Fashioned Peanut Butter" manufactured by the Leavitt Corporation, Everett, Mass.) were placed in a series of identical 30 milliliter capacity centrifuge tubes (see Example 1). Increasing concentrations of food grade propylene glycol-USP (obtained from the Arco Chemical Company, Newtown Square, Pa.) ranging from zero to 5.0% by weight, were added and blended into 10 g quantities of peanut butter. These blended samples were then centrifuged at low speed (1500 rpm) for 5 minutes, as in Example 1, to simulate natural settling of peanut solids and release unbound ("non-stabilized") peanut oil. After centrifugation, the peanut butter samples were sealed in their centrifuge tubes, and the separated peanut oil from centrifugation was allowed to remain in equilibrium contact with the peanut butter surface at room temperature (72° F.) for 16 hours. In the event that the centrifugation step resulted in more oil being forced from the peanut butter than would have occurred normally during resting on the shelf (at 1× gravity), this equilibration allowed any such oil to be reabsorbed The equilibrium quantity of separating oil found on the surface of each peanut butter sample was measured by carefully removing and weighing the oil. These weights of separating oil were converted to percentages based upon weight of oil versus weight of solids, normalized to percentages of the control (100%) sample having no stabilizer. Subtracting these percentages from 100% yields the percentage of oil stabilized. The results are shown in Table VII.

TABLE VII

Propylene Glycol Stabilizer

| Stabilizer Concentr. | Separated Oil (gm) | Oil Separating | Oil Stabilized |
|---|---|---|---|
| none (control) | 0.47 | 100% | 0% |
| 0.40% | 0.13 | 26% | 74% |
| 0.50% | 0.07 | 14% | 86% |
| 0.60% | 0.04 | 8% | 92% |
| 0.70% | 0.010 | 2% | 98% |
| 0.80% | 0.002 | 0.4% | 99+% |
| 1.00% | 0.002 | 0.4% | 99+% |
| 1.20% | 0.000 | 0.0% | 100% |
| 2.0% | 0.000 | 0.0% | 100% |
| 5.0% | 0.000 | 0.0% | 100% |

Observations and conclusions from this experiment were as follows: The percentage of oil stabilized by the propylene gycol rises dramatically to nearly 100% at concentrations of propylene glycol above 0.6%-0.7%. With this particular peanut butter (Teddie brand), a level of approximately 0.7% -0.8% appears to be very adequate for achieving oil stabilization. A barely detectable but pleasant slightly sweet after taste can be detected for propylene glycol levels of approximately 0.8% by weight. All peanut butter samples prepared in this test with varying concentrations of propylene glycol remained acceptably spreadable on bread and sticky (comparable to the unstabilized "control" peanut butter) on a spreading knife. At 1.2% this sweetness is more noticeable and tastes pleasant even at levels of 2%. For other peanut butter preparations, the optimum propylene glycol concentration to achieve oil stabilization may differ, as for example, with reduced fat peanut butters which have been found to require proportionately less stabilizer.

EXAMPLE 9

Experiments were conducted to test the compatibility of silicon dioxide and propylene glycol in peanut butter stabilization. Varying proportions of propylene glycol were blended into the same type of regular peanut butter used in Example 8 containing fixed concentrations of fumed silica (Cab-O-Sil® M-5). Concentrations ranging from 0.1% to 2% by weight propylene glycol were combined with peanut butter containing 0.2%, 0.5% and 1% by weight fumed silica. It was observed that the two stabilizers cooperated with one another to prevent peanut oil separation from the solids. As one example, 0.5% by weight propylene glycol combined with 0.5% fumed silica stabilized the peanut butter. Therefore, the two stabilizers can be used either separately or in combination.

Possible Mode of Action of Microparticulate Silica and Propylene Glycol

The mode of action is discussed in the context of peanut butter, but is expected to be similar in the case of other vegetable kernel butters. While microparticulate $SiO_2$ containing silanol (Si—OH) surface groups is substantially hydrophilic, it is believed that when such $SiO_2$ is added to peanut butter or other vegetable kernel butter, it initially mixes with and disperses into the peanut oil (or other vegetable kernel oil) phase. Having an enormous surface area (up to approximately 400 $m^2$/gm) and being surface-active, the $SiO_2$ may also adhere to and alter the surface properties of the ground peanut particles (or solids from other types of kernels). The binding of peanut oil to peanut particles may be strengthened by the bridging action of the multiple hydroxyl groups on the $SiO_2$ particles, helping to sequester the peanut oil around the peanut particles.

To the extent that an increased amount of oil (which is less dense than the solids) becomes associated with each peanut particle, the particle density decreases. If the difference in density between the oil and the oil-coated peanut solids is substantially diminished, the peanut solids cease "settling" out of the oil. Looked at still another way, as the amount of peanut oil bound up with each peanut particle is increased, the amount of "free" oil which can easily separate from the solids is diminished.

On a weight efficiency basis, an amorphous fumed silica such as Cab-O-Sil® EH-5, whose particle size is smaller (0.007 microns in diameter) and surface area is greater (380 $m^2$/gm), works somewhat more efficiently than Cab-O-Sil® M-5 whose particle diameter is somewhat larger (approximately 0.014 microns) and surface area somewhat smaller (200 $m^2$/gm). The Cab-O-Sil® silicas are, in turn, more efficient than silica gels having a 2–4 micron particle diameter, and produce a peanut butter having superior texture.

Applicant has empirically found that different grinds of peanut butter require somewhat different weight proportions of $SiO_2$ to achieve complete oil sequestration. Furthermore, a wetter or drier mouth feel can be achieved using lesser or greater proportions of $SiO_2$. Generally, for a spreadable butter, the minimum but sufficient quantity of $SiO_2$ (which, when added to the natural peanut butter, prevents peanut oil separation upon sitting at 25–30° C.) should be utilized. For other food applications such as candy filling, a drier peanut butter mixture may be appropriate.

The mechanism of propylene glycol stabilization of peanut butter and other nut butters remains somewhat of a mystery. Like $SiO_2$, propylene glycol is a hydroxyl group-containing hydrophilic food additive. While it does not dissolve in vegetable oil, it may stabilize the interface between the nut solids and the oil to reduce the rate of oil separation.

While the above explanations are suggested to explain the stabilization function of the described hydroxylated stabilizers, this explanation is not critical to the invention, and other mechanisms may additionally or alternatively be responsible for the described effects.

Cost Efficiency

The price of $SiO_2$ (purchased in large commercial quantities) ranges from approximately $1.50 per pound (for typical microparticulate silica gels) to $3.50 per pound (for microparticulate fumed silicas) depending upon the particle size, commercial source, manufacturing process, etc. At a 1.0–1.5% by weight concentration of $SiO_2$ in natural peanut butter, the cost of $SiO_2$ required to prevent oil separation is expected to be approximately 2–5 cents per pound of peanut butter.

The price of propylene glycol is approximately $0.70 per pound and at a concentration of 0.5% by weight in nut butters, it should not increase the cost of the products because its cost per pound is comparable to that of peanut butter.

With the above disclosure of the present invention, those skilled in the art will recognize that additional microparticulate forms of silica and silicon-containing materials including the silicates, can be identified, and additional chemicals related to propylene glycol can also be identified having characteristics suitable for use in stabilizing peanut butter against peanut oil separation, or similarly in stabilizing other vegetable kernel butters against oil separation. It is noted that fumed silica with its multiple active Si—OH groups and propylene glycol with its two-adjacent C—OH groups share the property of being fat-insoluble, multi-hydroxyl compounds. Indeed, despite the fact that ethylene glycol is toxic, this diol (two hydroxyl groups) has also been found to prevent oil separation in peanut butter. Thus, this invention is not limited to the materials disclosed, but includes the use of other related materials which have the requisite property of helping to maintain a homogeneous peanut butter mixture of peanut solids in peanut oil, or helping to maintain other vegetable kernel butter mixtures of vegetable kernel oil and solids in a homogeneous mixture.

Other embodiments of the present invention are within the following claims.

What I claim is:

1. A stabilized peanut butter or peanut butter-containing food composition, consisting essentially of a mixture of:
   (a) ground peanuts, and
   (b) between 0.25% and 4% by weight of microparticulate silicon dioxide to said ground peanuts,
   wherein said silicon dioxide prevents or retards spontaneous separation of the peanut oil and the ground peanut solids.

2. The composition of claim 1, wherein said percent by weight of said microparticulate silicon dioxide is between approximately 0.25% and 2%.

3. The composition of claim 1, wherein the form of silicon dioxide in said microparticulate silicon dioxide is selected from the group consisting of amorphous fumed silica, amorphous silica gel, silica hydrogel, precipitated silica, colloidal silica, silica aerogel and crystalline silica.

4. The composition of claim 1, wherein said form of silicon dioxide in said microparticulate silicon dioxide is amorphous fumed silica.

5. The composition of claim 4, wherein the primary particle diameter of said microparticulate silicon dioxide is between approximately 0.005 and 0.025 microns.

6. The composition of claim 1, further comprising at least one other constituent selected from the group consisting of fully hydrogenated vegetable oil, monoglycerides, diglycerides, partially hydrogenated vegetable oil, and maltodextrin,
   wherein the proportion by weight of said silicon dioxide plus said other constituent(s) does not exceed 10% of the weight of said peanut butter or said peanut butter-containing food composition.

7. The composition of claim 1, wherein said composition is a peanut butter.

8. A method for preventing the spontaneous separation of peanut oil and ground peanut solids in a peanut butter or a peanut butter-containing food composition, said method consisting essentially of the step of:
   combining between 0.25% and 4% by weight of microparticulate silicon dioxide with said peanut butter,
   wherein said silicon dioxide prevents or retards spontaneous separation of the peanut oil and the ground peanut solids.

9. The method of claim 8, wherein said percent by weight of said microparticulate silicon dioxide which is combined with said peanut butter does not exceed 2%.

10. The method of claim 8, further comprising the step of:
    combining with said peanut butter at least one other constituent selected from the group consisting of fully hydrogenated vegetable oil, monoglycerides, diglycerides, partially hydrogenated vegetable oil, and maltodextrin,
    wherein the proportion by weight of silicon dioxide plus the other constituent(s) does not exceed 10% of the weight of said peanut butter.

11. The method of claim 8, wherein said composition is a peanut butter.

12. A method for modifying the texture of peanut butter, said method consisting essentially of the step of:
    combining between 0.25% and 4% by weight of microparticulate silicon dioxide with said peanut butter,
    wherein said silicon dioxide prevents or retards spontaneous separation of the peanut oil and the ground peanut solids.

13. The method of claim 12, wherein said percent by weight of said microparticulate silicon dioxide which is combined with said peanut butter does not exceed 2%.

14. The method of claim 12, further comprising the step of:
    combining with said peanut butter at least one other constituent selected from the group consisting of fully hydrogenated vegetable oil, monoglycerides, diglycerides, partially hydrogenated vegetable oil, and maltodextrin,
    wherein the proportion by weight of silicon dioxide plus the other constituent(s) does not exceed 10% of the weight of said peanut butter.

15. A stabilized vegetable kernel butter-containing food composition, consisting essentially of a mixture of:
    (a) oil-bearing, ground edible kernels from seeds or nuts, and
    (b) between 0.25% and 4% by weight of microparticulate silicon dioxide to said ground edible kernels,
    wherein said silicon dioxide prevents or retards spontaneous separation of the oil from the oil-bearing edible kernels and the solids from the ground edible kernels.

16. The composition of claim 15,
    wherein said oil-bearing, ground edible kernels are selected from the group consisting of peanuts, cashews, almonds, hazelnuts, walnuts, Brazil nuts, coconuts, sesame seeds, soybeans, and sunflower kernels.

17. The composition of claim 15,
    wherein said percent by weight of said microparticulate silicon dioxide is between approximately 0.25% and 2%.

18. The composition of claim 15, wherein said composition is a vegetable kernel butter.

19. A method for preventing or slowing the spontaneous separation of vegetable kernel oil and ground vegetable kernel solids in a ground, edible kernel butter-containing food composition, said method consisting essentially of the step of:
    combining between 0.25% and 4% by weight of microparticulate silicon dioxide with said ground kernel butter,
    wherein said silicon dioxide prevents or retards spontaneous separation of the oil from the oil-bearing edible kernels and the solids from the ground edible kernels.

20. The method of claim 19,
    wherein said percent by weight of said microparticulate silicon dioxide which is combined with said ground kernel butter does not exceed 2%.

21. The method of claim 19, wherein said composition is a vegetable kernel butter.

* * * * *